United States Patent [19]
Ohkubo

[11] Patent Number: 5,974,359
[45] Date of Patent: Oct. 26, 1999

[54] METHOD AND APPARATUS FOR CORRECTING OUTPUT SENSITIVITY, AND NAVIGATION SYSTEM

[75] Inventor: Masashi Ohkubo, Kanagawa, Japan

[73] Assignee: Sony Corporation, Tokyo, Japan

[21] Appl. No.: 08/903,289

[22] Filed: Jul. 30, 1997

[30] Foreign Application Priority Data

Aug. 13, 1996 [JP] Japan ................................. 8-231325

[51] Int. Cl.⁶ .................................................. G01C 21/00
[52] U.S. Cl. .......................... 701/214; 701/216; 701/217; 701/221; 364/443; 364/444; 364/449; 364/453; 364/454; 364/449.8; 342/357; 250/561; 324/166
[58] Field of Search ................................... 701/214, 216, 701/217, 221; 364/443, 444, 449, 453, 454, 449.8; 342/357; 250/561; 324/166

[56] References Cited

U.S. PATENT DOCUMENTS

| | | | |
|---|---|---|---|
| 4,140,970 | 2/1979 | Graziano | 324/166 |
| 5,220,509 | 6/1993 | Takemura et al. | 364/449 |
| 5,276,451 | 1/1994 | Odagawa | 342/357 |
| 5,278,424 | 1/1994 | Kagawa | 250/561 |
| 5,483,457 | 1/1996 | Shibata et al. | 364/454 |
| 5,539,647 | 7/1996 | Shibata et al. | 364/454 |
| 5,699,256 | 12/1997 | Shibuya et al. | 364/453 |
| 5,796,613 | 8/1998 | Kato et al. | 364/449.8 |

*Primary Examiner*—William A. Cuchlinski, Jr.
*Assistant Examiner*—Olga Hernandez
*Attorney, Agent, or Firm*—Jay H. Maioli

[57] ABSTRACT

A method for correcting the output sensitivity an angular velocity detector, in which, a first running directional data of the mobile object is successively calculated in accordance with the output signal of the angular velocity detector, a second running directional data of the mobile object is successively calculated in accordance with the positioning data obtained from a plurality satellites, the sensitivity correction coefficient is calculated in based on the stored first and second running directional data, and the sensitivity correction coefficient is multiplexed by the output signal of the angular velocity detector, so as to correct the output sensitivity of the angular velocity detector. Therefore, the dispersion of the output sensitivity of the angular velocity detector is eliminated to improve the accuracy of output sensitivity.

7 Claims, 8 Drawing Sheets

| ADDRESS | MEMORY AREA FOR SELF-DATA DIRECTION B$_{CAR}$ | MEMORY AREA FOR GPS-DATA DIRECTION B$_{GPS}$ |
|---|---|---|
| 0 | 30° | 30° |
| 1 | 32° | 33° |
| 2 | 34° | -1.0 |
| 3 | 35° | -1.0 |
| 4 | 7° | 2° |
| 5 | 8° | 3° |
| ⋮ | | |
| k-1 | 28° | 28° |

(k PIECES)

FIG. 3

METHOD AND APPARATUS FOR CORRECTING OUTPUT SENSITIVITY, AND NAVIGATION SYSTEM

BACKGROUND OF THE INVENTION

1. Field of the Invention

This invention relates to a sensitivity correcting method, a navigation system and a vehicle, and more particularly, is applied to a car navigation system for detecting the position of a vehicle and displaying its position on a map.

2. Description of the Related Art

Heretofore, various car navigation systems for reading out map data from the memory medium such as a compact disk read only memory (CD-ROM), and displaying a position of a vehicle on the map obtained to support the driver on his driving operation by guiding him along the road, have been provided. In such as car navigation system, a global positioning system (GPS) receiver has been widely used as a position detecting means for detecting the position of the vehicle. The GPS receiver receives positioning data from the plurality of satellites which rotate round the earth, and analyzes the positioning information to detect the position of the vehicle.

Since the GPS receiver basically detects the position by receiving radio waves from the GPS satellites, it causes a problem such as the position cannot be detected with sufficiently high accuracy when the vehicle is in an area like a city in which radio waves from the GPS satellites can hardly be received, or the vehicle is running at low speed.

To solve the above problem, various methods have been provided: One of them is a method of using a self-navigation system in addition to the GPS navigation described above. In the self-navigation system, the position of the vehicle is detected by obtaining a driving route of the vehicle based on a driving speed and running direction of the vehicle and adding the driving route to the coordinates at the start point of the vehicle. Therefore, in a car navigation system employing the GPS navigation and self-navigation systems, an angular velocity detector such as a piezo-electric vibrating gyroscope is provided. The running direction of the vehicle will be obtained by detecting its angular velocity when the vehicle changes the running direction. Note that, the driving speed is generally obtained from a speed detector provided in the vehicle.

In this manner, the latest car navigation system can accurately detect the position b vehicle by employing the GPS navigation to detect the position of which receiving radio waves from the GPS satellites, and the self-navigation to detect the position based on the driving speed and running direction (angular velocity) of the car.

In the self-navigation system, the position detection is performed on the basis of running directional data obtained by the angular velocity detector as described above. However, in general, the angular velocity detector has variations in its output sensitivity (that is the relationship between an angular velocity detected and the signal level of an output signal showing the angular velocity), thus it causes a problem that the running directional data obtained from the angular velocity detector varies so that an accurate position can not be detected.

To detect the correct position, the output sensitivity of the angular velocity detector is adjusted at the factory. However, the output sensitivity may vary again depending on the mounting manner of the car navigation to a vehicle. For example, in the case where an attachable position is limited, the car navigation system may be attached slanted, and thus the angular velocity detector is also slanted. As a result, the reference axis of rotating detection shifts from the desired direction (e.g., the perpendicular direction of the vehicle) and thus the expected output sensitivity can not be obtained.

SUMMARY OF THE INVENTION

In view of the foregoing, an object of this invention is to provide a sensitivity correcting method capable of improving the accuracy of output sensitivity of an angular velocity detector, a navigation system capable of improving the accuracy of position detection in utilizing that method, and a vehicle capable of detecting accurately its position by specially mounting the navigation system.

The foregoing object and other objects of the invention have been achieved by the provision of a method for correcting the output sensitivity of an angular velocity detector which detects running directional data of a mobile object. In the method, a first running directional data of the mobile object is successively calculated in accordance with the output signal of the angular velocity detector; a second running directional data of the mobile object is successively calculated in accordance with the positioning data obtained from a plurality of satellites; the first and second running directional data of the mobile object are stored; the sensitivity correction coefficient is calculated in accordance with the stored first and second running direction data; and the sensitivity correction coefficient is multiplexed by the output signal of the angular velocity detector so as to correct the output sensitivity of the angular velocity detector.

According to this invention, in the method for correcting the output sensitivity of the angular velocity detector which detects the running directional data of the mobile object, the running direction data of the mobile object is successively calculated in accordance with the output signal of the angular velocity detector; the road directional data of a road on which the mobile object moves is calculated from the map data; the sensitivity correction coefficient is calculated in accordance with the running directional data of the mobile object and the road directional data; and the sensitivity correction coefficient is multiplexed by the output signal of the angular velocity detector to correct the output sensitivity of the angular velocity detector.

Further, according to this invention, a navigation system provided in the mobile object comprises: a display means; a first storing means for storing map data; an angular velocity detector for successively outputting first running directional data of the mobile object; a GPS receiver for successively outputting second running directional data of mobile object in accordance with positioning data obtained from a plurality of a control means for calculating a sensitivity correction coefficient in accordance with the stored first and second running directional data of the mobile object and multiplexing the sensitivity correction coefficient by the output signal of the angular velocity detector to correct the output sensitivity of the angular velocity detector, and for calculating the position of the mobile object from the running directional data of the mobile object by the angular velocity detector and the running distance of the mobile object to display the index showing the position of the mobile object with the map data read from the first storing means.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a schematic diagram showing the structure of a ring buffer memory;

DETAILED DESCRIPTION OF THE EMBODIMENT

Figure 1:
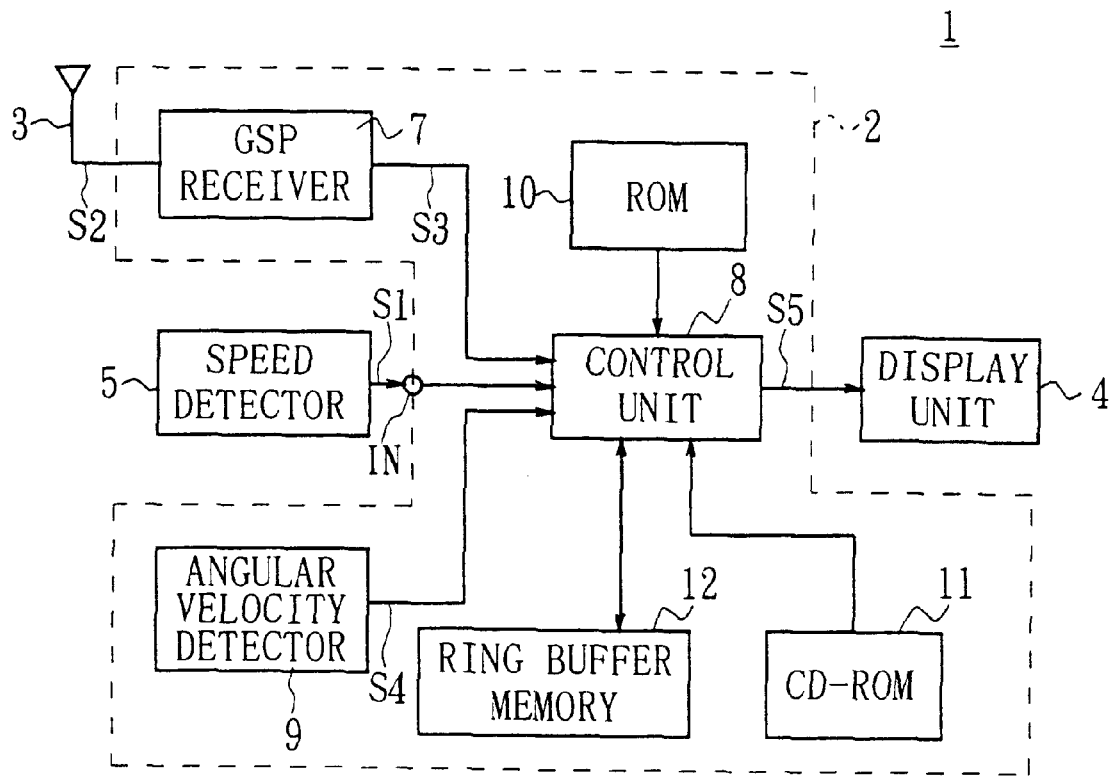
FIG. 1 is a block diagram showing the construction of a car navigation system according to an embodiment of the present invention.

Preferred embodiments of this invention will be described with reference to the accompanying drawings:

Referring to FIG. 1, 1 generally shows a car navigation system according to the present invention. The car navigation system 1 comprises a main body 2 comprising various circuits for detecting the vehicle's position, an antenna 3 for receiving radio waves from GPS satellites, and a display 4 for displaying the vehicle's position detected on a map.

The car navigation system 1 uses both a GPS navigation and a self-navigation to detect the position of vehicle accurately. In general, self-navigation requires running directional data (angular velocity) of the vehicle and driving speed data of the vehicle. However, this car navigation system 1 obtains the driving speed data from a speed detector 5 in the vehicle equipped with the car navigation system 1.

Figure 2:
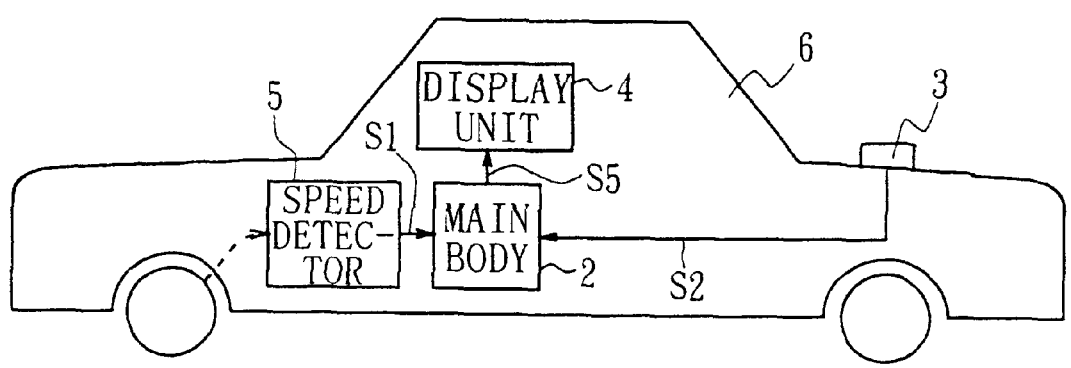
FIG. 2 is a block diagram explaining the case where the car navigation system is mounted in a vehicle.

More specifically, as shown in FIG. 2, in the case where the car navigation system 1 is mounted on a vehicle 6, the car navigation system 1 picks up a speed signal S1 from the speed detector 5 provided in the vehicle 6 and supplies it to an input terminal IN of the main body 2 to obtain the driving speed data.

In the car navigation system 1, electric waves from the GPS satellites received with the antenna 3 are supplied to a GPS receiver 7 as a receiving signal S2. The GPS receiver 7 obtains positioning data from the receiving signal S2 received from at least three GPS satellites and by analyzing said positioning data, computes the positional data of the vehicle (i.e., latitude and longitude), and computes the running directional data of the vehicle based on the accumulated positional data.

The positioning data from the GPS satellites is given spectrum diffusion modulation using a false noise code (PN code). The GPS receiver 7 converts the frequency of the receiving signal S2 to an intermediate frequency, and further executes a spectrum inverted diffusion by multiplying the false noise code which has the same code sequence and phase as that of the satellites by the intermediate frequency signal. Then the GPS receiver 7 conducts orthogonal delayed wave detection on the resultant signal and demodulates the positioning data, analyzes the positioning data, computes the positional data and the running directional data, and supplies these data to a control unit 8 as GPS navigation data S3.

On the other hand, an angular velocity detector 9 for self-navigation is provided in the main body 2. The driving directional data of the vehicle is detected by this angular velocity detector 9. For example, a piezo-electric vibrating gyroscope is used as the angular velocity detector 9, in this embodiment. The piezo-electric vibrating gyroscope detects rotation centering around a rotation detecting reference axis by utilizing the transformation of piezo-electric ceramics which are adhered to the vibrator caused by the action of Coriolis force when the vehicle turns and it generates a voltage proportional to an angular velocity in rotation. The angular velocity detector 9 detects an angular velocity accompanying the turn of the vehicle using such piezo-electric vibrating gyroscope and supplies the resulting output voltage to the control unit 8 as an angular velocity signal S4.

The speed signal S1 obtained from the speed detector 5 is also-input to the control unit 8 via the input terminal IN.

The control unit 8 obtains the driving mileage and the running direction of the vehicle by integrating the speed signal S1 obtained from the speed detector 5 and the angular velocity signal S4 obtained from the angular velocity detector 9 respectively, and computes the driving route of the vehicle by sequentially this data. The control unit 8 adds the driving route data to the coordinates at the start point and detects the vehicle's position by self-navigation. In addition, the control unit 8 obtains the position of the vehicle by the GPS navigation based on the GPS navigation data S3 obtained from the GPS receiver 7. Thus, the control unit 8 can determine the most probable position according to the vehicle's positions obtained by these two types of navigation.

Map data is stored in a CD-ROM 11. The map data has the coordinates of all roads and intersections in the form of digital data, in which intersections are shown by nodes and roads are shown by links connecting between nodes. The map data also includes road directional data in the form of digital data.

The control unit 8 reads out the map data around the vehicle's position detected as described above from the map data stored in the CD-ROM 11 and generates a video signal S5 in which the vehicle's position detected is put over the map. The signal S5 is supplied to the display unit 4, and thus the display unit 4 displays a map screen showing the vehicle's position.

The control unit 8 operates in accordance with program codes stored in a read only memory (ROM) 10 and executes the positional computation described above or the other procedures.

Furthermore, the control unit 8 stores the running direction data of the vehicle computed from the angular velocity signal S4 obtained from the angular velocity detector 9 and the running direction data of the vehicle obtained from the GPS navigation data S3 to a ring buffer memory 12 respectively.

By the way, in general, the output sensitivity of the angular velocity detector 9 varies. Thereby, if the positional detection is conducted using the original running direction computed based on the angular velocity signal S4 from the angular velocity detector 9 as it is, and error for unevenness of the output sensitivity of the angular velocity detector 9 is included in the vehicle's position data as detected. As a result, an accurate positional detection might not be executed. To improve the accuracy of position to be detected by self-navigation, the car navigation system 1 corrects the output sensitivity of the angular velocity detector 9 according to the processing as described below.

In the car navigation system 1, the running direction data of the vehicle computed based on the angular velocity signal S4 supplied from the angular velocity detector 9 (hereinafter, this running direction of the vehicle is referred to as the own car bearing) is stored in the ring buffer memory 12 as described above. Also, the running direction data of the vehicle obtained from the GPS navigation data S3 (hereinafter, the running direction of the vehicle is referred to as the GPS bearing) is stored in the ring buffer memory 12. The GPS bearing stored in the ring buffer memory 12 is used to compute a sensitivity correction coefficient to correct the output sensitivity of the angular velocity detector 9. The sensitivity correction coefficient is multiplexed by the angular velocity signal S4 from the angular velocity detector to correct the output sensitivity. The correct direction of the present position is obtained based on the resultant angular velocity signal.

As shown in FIG. 3, the ring buffer memory 12 having k pieces of buffer areas (they have an address of "0" to "k−1") is used. Each buffer area is divided into the own car bearing memory area $B_{CAR}$ and a GPS bearing memory area $B_{GPS}$ to store respective directional data. In this case, a ring counter RC to count the addresses area in which the data will be stored in the ring buffer memory 12 is provided, and the control unit 8 stores the own car bearing and the GPS bearing in the buffer areas ($B_{CAR}$ and $B_{GPS}$) of the addresses shown by the ring counter RC in succession. At this time, since the ring counter RC counts 0 to k−1 in a circulating manner, the control unit 8 stores the own car bearing and the GPS bearing in the ring buffer memory 12 in rotation.

The car navigation system 1 computes a sensitivity correction coefficient using the GPS bearing as described above. However, if the sensitivity correction coefficient is computed using the GPS bearing when the accuracy of the GPS bearing is low, the GPS navigation system 1 might not compute a correct sensitivity correction coefficient. Then, when the accuracy of GPS bearing is low, e.g., when the driving speed of the vehicle is low, the car navigation system 1 stores "−1.0" to order the GPS bearing to stop the correction by the GPS bearing. Thus, it is previously prevented that the accuracy of the own car bearing is worsened by computing the sensitivity correction coefficient using the inaccurate GPS bearing data and correcting output sensitivity using this sensitivity correction coefficient.

For example, when the ring counter RC shows a value "RC=4", the control unit 8 stores the own car bearing and the GPS bearing in the ring buffer area at the address "4" respectively. As a result, the own car bearing and the GPS bearing stored in the ring buffer area at the address "4" become the latest directional data, and the own car bearing and the GPS bearing stored in the part of the following address "5" become the oldest directional data in the ring buffer area. The control unit 8 detects a change in the directional data based on the latest directional data and the oldest directional data, and computes a sensitivity correction coefficient from the result.

Specifically, the control unit 8 firstly obtains the difference between the latest own car bearing and the oldest own car bearing to determine a change of the own car bearing. Then, the bearing control unit 8 obtains the difference between the latest own car bearing and the latest GPS bearing, and at the same time obtains the difference between the oldest own car bearing and the oldest GPS bearing. The control unit 8 further obtains the difference between these differences to determine the change in the own car bearing to the GPS bearing. The control unit 8 obtains a sensitivity correction coefficient based on these two changes (that is positive and negative in the differences thus obtained).

The computing procedure of sensitivity correction coefficient by the control unit 8 will be described in detail with reference to the flowcharts shown in FIGS. 4 to 6.

At step SP1, the control unit 8 starting from step SP0, sets the ring counter RC to "0" as an initial setup and proceeds to the following step SP2. At step SP2, the control unit 8 judges whether or not the speed of the vehicle is faster than the fixed speed (e.g., over 30 km/s) based on the speed signal S1 from the speed detector 5. As a result, if an affirmative result is obtained, the control unit 8 proceeds to step SP3. If a negative result is obtained, the control unit 8 proceeds to step SP4. The reason for detecting the speed of the vehicle is that since the accuracy of the GPS bearing is low as described above when the vehicle is running at low speed, if a sensitivity correction coefficient is obtained by the GPS bearing to correct the own car bearing, the accuracy of the own car bearing might be lowered. Therefore, the control unit 8 determines whether or not the GPS bearing is reliable by detecting the speed of the vehicle, and utilizes the reliable GPS direction only to improve the accuracy of the own car bearing.

At step SP3, the control unit 8 stores the own car bearing obtained from the angular velocity signal S4 to the ring buffer area $B_{CAR}$ of the address indicated by the ring counter RC. At the following step SP5, the control unit 8 judges whether or not the position has been measured more than twice in succession by a GPS receiver, (that is, it judges whether or not the GPS bearing has been measured more than twice in succession). As a result, if the position has been measured more than twice in succession, the control unit 8 proceeds to the following step SP6. On the contrary, if it has not been measured more than twice in succession, the control unit 8 returns to step SP4. Thereby, the control unit 8 can obtain a sensitivity correction coefficient using only the reliable GPS bearing, and improve the accuracy of the own car bearing.

At step SP6, the control unit 8 stores the GPS bearing obtained by the GPS receiver 7 in the ring buffer area $B_{GPS}$ of the address indicated by the ring counter RC.

On the other hand, at step SP4, the control unit 8 stores a value "−1.0" in the ring buffer area $B_{GPS}$ of the address indicated by the ring counter RC. The value shows that the sensitivity correction coefficient cannot be calculated using the GPS bearing data.

Upon completing the processing of steps SP4 and SP6, the control unit 8 proceeds to step SP7. At this step SP7, the control unit 8 compares a variable $S_{SUM}$ that shows a learning degree of the sensitivity correction coefficient (i.e., a progressive degree of the computation of the sensitivity correction coefficient) and a constant $S_{MAX}$ that shows a terminate value of the learning. If the variable $S_{SUM}$ is larger than the constant $S_{MAX}$, the control unit 8 proceeds to the following step SP8. On the other hand, if the variable $S_{SUM}$ is smaller than the constant $S_{MAX}$, the control unit 8 proceeds to step SP9 skipping the following step SP8.

In this connection, the variable $S_{SUM}$ showing a learning degree is set to a value "0" when the learning is started. The variable $S_{SUM}$ is a variable which becomes larger as the learning (i.e., the computation of a sensitivity correction coefficient) progresses. On the other hand, the constant $S_{MAX}$ showing the terminate value of the learning is a reference value to determine and upper limit of the learning and is set to the fixed value. The reason to set a upper limit of learning is that if the learning progresses beyond a certain degree, the value of sensitivity correction coefficient does not vary practically. In this case, the processing can be simplified by setting the upper limit of learning.

At step SP8, the control unit 8 substitutes the constant $S_{MAX}$ showing the complete value of learning for the variable $S_{SUM}$ showing the learning degree to stop the learning.

At the following step SP9, the control unit 8 adds the value "1" to the value of ring counter RC to increment the ring counter RC.

At the following step SP10, the control unit 8 judges whether or not the number of values of ring counter RC is more than k in the buffer area. If there are k pieces or more, the control unit 8 proceeds to step SP11. On the other hand, if there are less than k, the control unit 8 proceeds to step SP12.

At step SP11, the control unit 8 firstly sets the ring counter RC to the value "0" to reset the ring counter RC. Then the control unit 8 reads out the GPS bearing stored in the ring buffer area BGPS of address (k−1) and substitutes it for the variable $GPS_{new}$, and reads out the GPS bearing stored in the ring buffer area $B_{GPS}$ of the address 0 and substitutes it for the variable $GPS_{old}$. Furthermore, the control unit 8 reads out the own car bearing stored in the ring buffer area $B_{CAR}$ of the address (k−1) and substitutes it for the variable $C_{new}$ and reads out the own car bearing stored in the ring buffer area $B_{CAR}$ of the address 0 and substitutes it for the variable $CAR_{old}$. In this case, since the value of ring counter RC has been incremented at step SP9, the latest directional data is stored in the area of the address indicated by the ring counter RC before being incremented, and the oldest directional data is stored in the address indicated by the ring counter RC after being incremented. However, at this step SP11, since the data has been stored till the end of the ring buffer area, the oldest directional data is stored in the address 0.

On the other hand, in step SP12, the control unit 8, as well as reading out the GPS bearing data stored in the address preceding the address indicated by the ring counter RC (i.e., the address "RC−1") of the ring buffer area $B_{GPS}$ and substituting it for the variable $GPS_{new}$, reads out the GPS direction stored in the address RC of the ring buffer area $B_{GPS}$ and substitutes it for the variable $GPS_{old}$. Furthermore, the control unit 8 as well as reading out the own car bearing stored in the address (RC−1) of the ring buffer area $B_{CAR}$ and substituting it for the variable $CAR_{new}$, reads out the own car bearing stored in the address RC of the ring buffer area $B_{CAR}$ and institutes it for the variable $CAR_{old}$.

After completing the processing of steps SP11 and SP12, the control unit 8 proceeds to the following step SP13. At step SP13, the control unit 8 judges whether or not the values of the own car bearing read out as the $GPS_{new}$ and the $GPS_{old}$ are both "−1.0". If the values are both "−1.0", the control unit 8 stops computing a sensitivity correction coefficient because the GPS bearing is an unreliable value, and returns to step SP2 and repeats the processing. On the other hand, if the value is not "−1.0", the control unit 8 proceeds to step SP14.

At step SP14, the control unit 8 obtains the value subtracted the variable $CAR_{old}$ from the variable $CAR_{new}$ as a parameter SUB1, i.e., the difference between the latest own car bearing and the oldest own car bearing, and determines changes in the own car bearing. At the following step SP15, the control unit 8 obtains the absolute value of the parameter SUB1 (i.e., |SUB1|) and judges whether or not the absolute value is 15° or more. As a result, if it is more than 15°, the control unit 8 proceeds to step SP16. On the contrary, if it is smaller than 15°, the control unit 8 stops computing a sensitivity correction coefficient, and returns to step SP2 and repeats the processing. The reason is that if the difference between directions is small, an accurate computation cannot be performed. That is, in this case, by stopping computing a sensitivity correction coefficient when the difference between the latest own car bearing and the oldest own car bearing is smaller than the fixed value, worsening the accuracy of own car bearing data seeking an incorrect sensitivity correction coefficient can be prevented.

At the following step SP16, the control unit 8 obtains the first differential data by subtracting the variable $GPS_{new}$ from the variable $CAR_{new}$, and obtains the second differential data by subtracting the variable $GPS_{old}$, and obtains the subtracted second differential data from the first differential data as a parameter SUB2. That is, the control unit 8, as well as obtaining the difference between the latest own car bearing and the latest GPS bearing, obtains the difference between the oldest own car bearing and the oldest GPS bearing and obtains the difference between these differences to investigate the change in own car bearing to the GPS bearing.

At the following step SP17, the control unit 8 divides a constant A (e.g., A=0.0001) by the value added "0.05" to the variable $S_{SUM}$ showing the learning degree, and makes value as the variable $S_{COE}$ showing the learning degree. Since the variable $S_{SUM}$ showing the learning degree begins from "0" as described above, the learning degree variable $S_{COE}$ becomes "0.0001/0.05" when it passes step SP17 at first.

At the following step SP18, the control unit 8 adds the learning degree variable $S_{COE}$ obtained in this time to the learning degree variable $S_{COE}$ obtained in the last time and substitutes the result to the learning degree variable $S_{SUM}$. Note that, at the time when it first passed step SP18, the value "0" is used as the learning degree variable $S_{COE}$ in the last time.

At the following step SP19, the control unit 8 judges positive and negative values of the parameters SUB1 and SUB2 obtained in steps SP14 and SP16, and shifts the following step in accordance with its determined result. That is, if both the parameters SUB1 and SUB2 are positive, or both are negative, the control unit 8 proceeds to step SP20. If it is neither case, the control unit 8 proceeds to step SP21.

Similarly, at step SP21, the control unit 8 judges positive and negative of the parameters SUB1 and SUB2, and changes the following step in accordance with the detected result. That is, if the parameter SUB1 is positive and the parameter SUB2 is negative, or the parameter SUB1 is negative and the parameter SUB2 is positive, the control unit 8 proceeds to step SP22. If it is neither case, the control unit 8 stops computing the sensitivity correction coefficient and returns to step SP2.

At step SP20, the control unit 8 obtains the value added "1.0" to the learning degree variable $S_{COE}$ obtained in step SP17, and multiplies the inverted value of this value by the sensitivity correction coefficient $S_{Adj}$ in the last time, and makes this value as the sensitivity correction coefficient $S_{adj}$ in this time. At the time when it passed step SP20 at first, the value "1.0" is used as the sensitivity correction coefficient $S_{adj}$ in the last time (i.e., the initial value of the sensitivity correction coefficient $S_{adj}$).

On the other hand, at step SP22, the control unit 8 obtains the value added "1.0" to the learning degree variable $S_{COE}$ obtained in step SP17, and multiplies the value by the sensitivity correction coefficient $S_{ADJ}$ in the last time. Thus obtained value is set to the sensitivity correction coefficient $S_{ADJ}$ in this time. Note that, in this step SP22, the value "1.0" is also used as the initial value of the sensitivity correction coefficient $S_{ADJ}$).

Upon completing the computation of sensitivity correction coefficient $S_{ADJ}$ in steps SP20 or SP22, the control unit 8 returns to step SP2 again and repeats the processing.

The control unit 8 multiplies the sensitivity correction coefficient $S_{ADJ}$ by the angular velocity signal S4 from the angular velocity detector 9 to correct the sensitivity according to the procedure different from the above-mentioned computation procedure, and obtains the own car bearing on the basis of the angular velocity signal which is the sensitivity corrected. This procedure is not shown in the figures.

According to the above structure, this car navigation system 1 detects the position of a vehicle by receiving radio waves from GPS satellites as well as detecting the position by self-navigation based on its driving speed and running direction. By obtaining both two kinds of positioning data, the car navigation system 1 can detect the position of the vehicle accurately. When the position is detected by the self-navigation, the driving speed data and running direction data of the vehicle are required. However, the car navigation system 1 obtains the driving speed from the speed detector 5 on the vehicle and obtains the running direction from the angular velocity detector 9 equipped with the main body.

By the way, the output sensitivity of a general angular velocity detector 9 is not constant. As a result, if the running direction is computed using the angular velocity signal S4 which is obtained from the angular velocity detector 9 as it is, it causes a difference owing to the fact that the output sensitivity varies when the running direction is computed. It is result that the difference is included also in the position of the vehicle to be detected.

Then, the car navigation system 1 corrects the output sensitivity of the angular velocity detector 9 on the basis of the running direction data obtained by the measurement by the satellites. Thereby, the car navigation system 1 can obtain the running direction data accurately from the angular velocity detector 9 and improving the accuracy of the position of the vehicle obtained by the self-navigation. More specifically, the car navigation system 1 obtains a sensitivity correction coefficient to correct the output sensitivity based on the GPS bearing which is obtained by receiving radio waves from the GPS satellites, corrects the output sensitivity by integrating the sensitivity correction coefficient by the angular velocity signal S4, and computes the own car bearing based on the angular velocity signal corrected. Thereby, the car navigation system 1 can correct the output sensitivity of the angular velocity detector 9 varies, and detect the position of the vehicle accurately.

Figure 4:
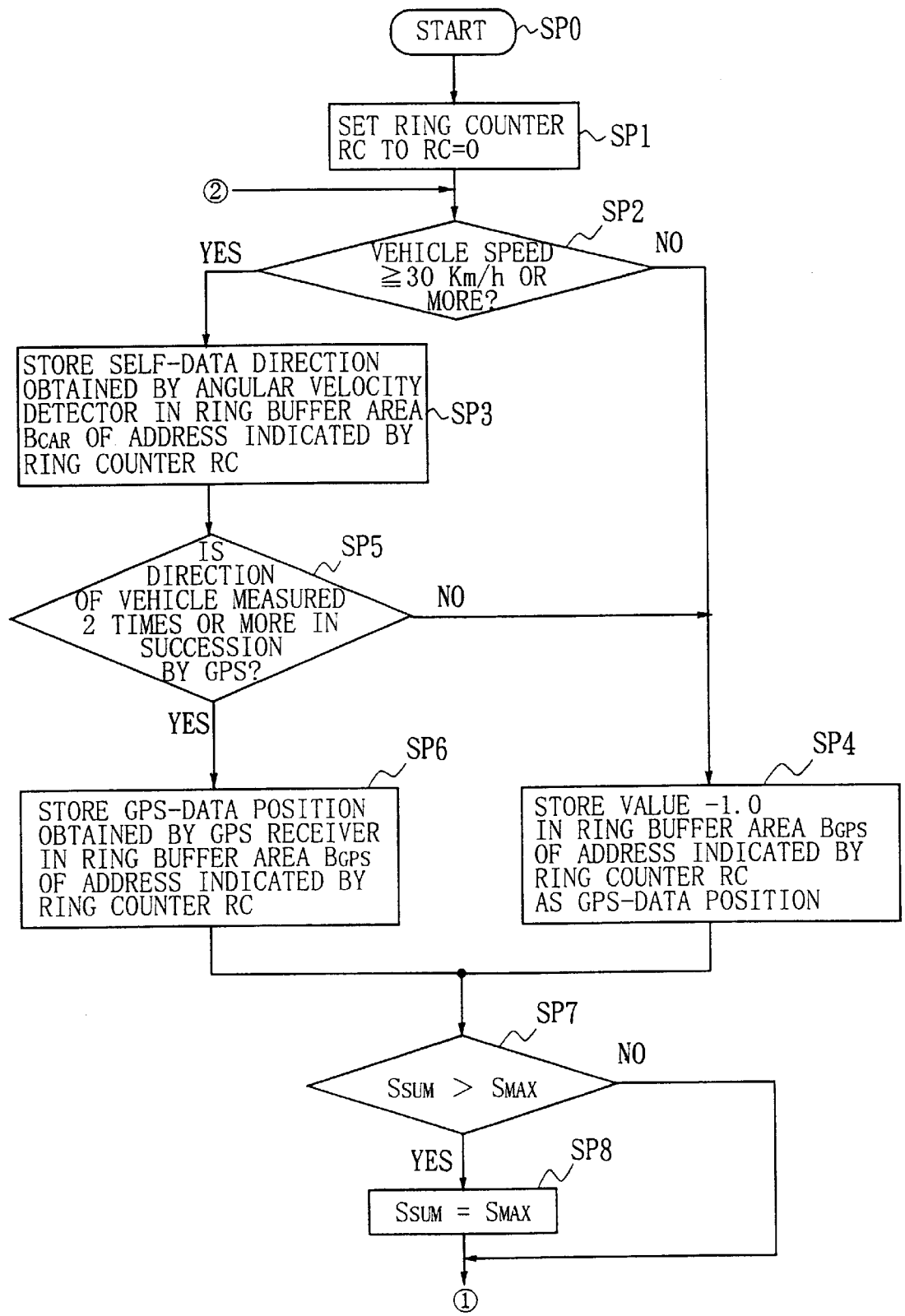
FIGS. 4, 5, and 6 are flowcharts showing the processing routine of computing a sensitivity correction coefficient.
Figure 5:
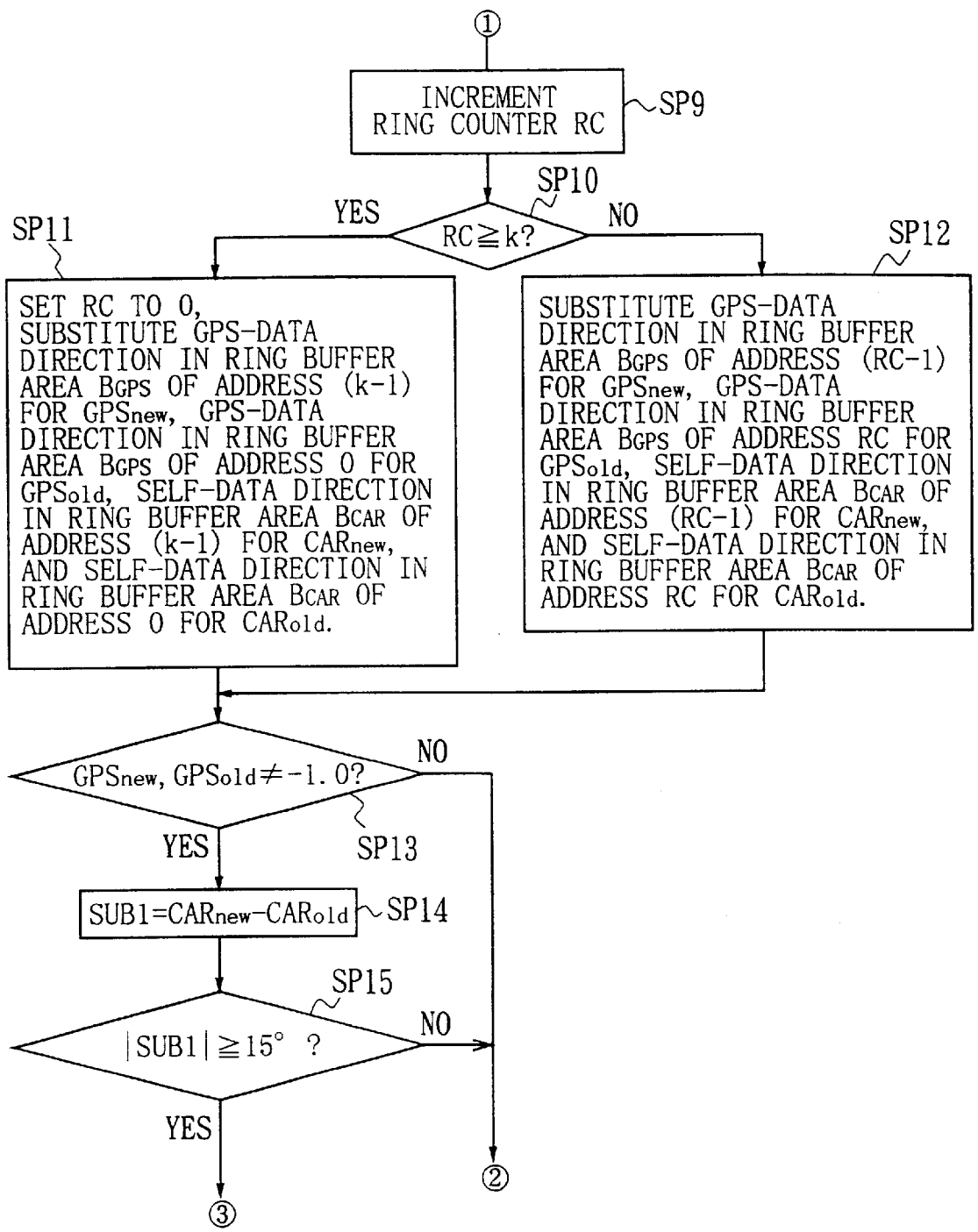
Figure 6:
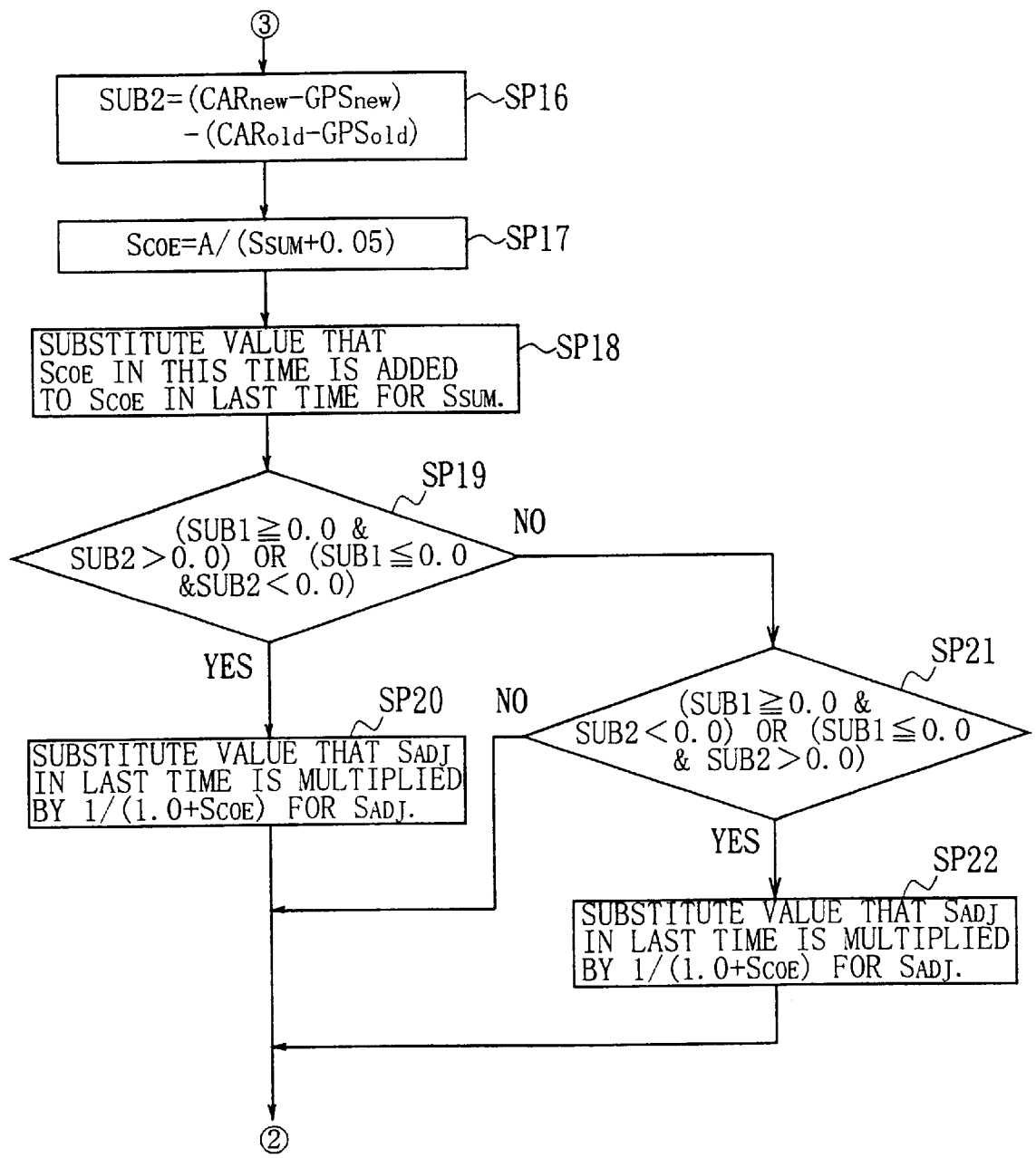

The car navigation system 1 executes the procedures as shown in FIGS. 4 to 6 to compute the sensitivity correction coefficient using the GPS bearing. In this computation, the sensitivity correction coefficient is computed using the own car bearing stored in the ring buffer memory 12 (i.e., the running direction computed from the angular velocity signal S4 obtained from the angular velocity detector 9) and the GPS bearing. At first, the car navigation system 1 determines whether or not the driving speed is more than the fixed speed to determine whether the GPS bearing, which becomes the reference in the computation of sensitivity correction coefficient, as computed is a reliable value or not. If the GPS bearing is the reliable value, the sensitivity correction coefficient is computed. Thereby, worsening the accuracy of the own car bearing in search for the sensitivity correction coefficient based on the unreliable GPS bearing can be prevented.

Next, the car navigation system 1 reads out the latest own car bearing and the oldest own car bearing stored in the ring buffer memory 12, and obtains the difference to detect a change in the own car bearing (the difference is denoted by a parameter SUB1 in FIG. 5). Then the car navigation system 1 reads out the latest own car bearing and the latest GPS bearing stored in the ring buffer memory 12, and obtains the difference between the two and reads out the oldest own car bearing and the oldest GPS bearing stored in the ring buffer memory 12 and obtains the difference between the two. Furthermore, the car navigation system 1 obtains the difference between these differences to detect the change in the own car bearing to the GPS bearing (the difference is denoted by a parameter SUB2 in FIG. 6).

The car navigation system 1 detecting these two kinds of changes, detects that the output sensitivity of the angular velocity detector 9 shifts to which direction, and increases/reduces the value of sensitivity correction coefficient depending on the direction shifted. That is, as described in the steps SP19 and SP21 of FIG. 6, the shifting direction of the output sensitivity is detected by determining positive and negative of the parameters SUB1 and SUB2, that show their respective changes. In this connection, in step SP19, the car navigation system 1 detects whether or not the output sensitivity shifts to the larger direction. If it is yes, the sensitivity correction coefficient $S_{ADJ}$ is reduced in the following step SP20. On the other hand, in step SP21, the car navigation system 1 detects whether or not the output sensitivity shifts to the smaller direction. If the answer is yes, the sensitivity correction coefficient $S_{ADJ}$ is increased in the following step SP22. Hereinafter, these processing are repeated alternately to obtain the sensitivity correction coefficient $S_{ADJ}$.

The obtained sensitivity correction coefficient $S_{ADJ}$ is multiplied by the angular velocity signal S4, thus the angular velocity signal S4 is corrected. In the case where the output sensitivity shifts to the larger direction, the sensitivity correction coefficient $S_{ADJ}$ is reduced so that the error in the output sensitivity can be corrected. In this embodiment, in step SP20, the sensitivity correction coefficient $S_{ADJ}$ is greatly reduced at first, and the reduction rate is gradually reduced as the learning progresses. Thereby, the error in the output sensitivity can be corrected at once at the time when starting the correction, thus the accuracy of the output sensitivity can be gradually improved as the learning progresses.

On the other hand, in the case where the output sensitivity shifts to the smaller direction, the sensitivity correction coefficient $S_{ADJ}$ is increased so that the error in the output sensitivity can be corrected just as is the case when the sensitivity shifts to the larger direction. Also in this case, in step SP22, the sensitivity correction coefficient $S_{ADJ}$ is greatly increased at first, and the increasing rate is reduced as the learning progresses. Thereby, the error in the output sensitivity can be corrected at once as soon as starting the correction, thus the accuracy of the output sensitivity can be gradually improved as the learning progresses.

Figure 7:
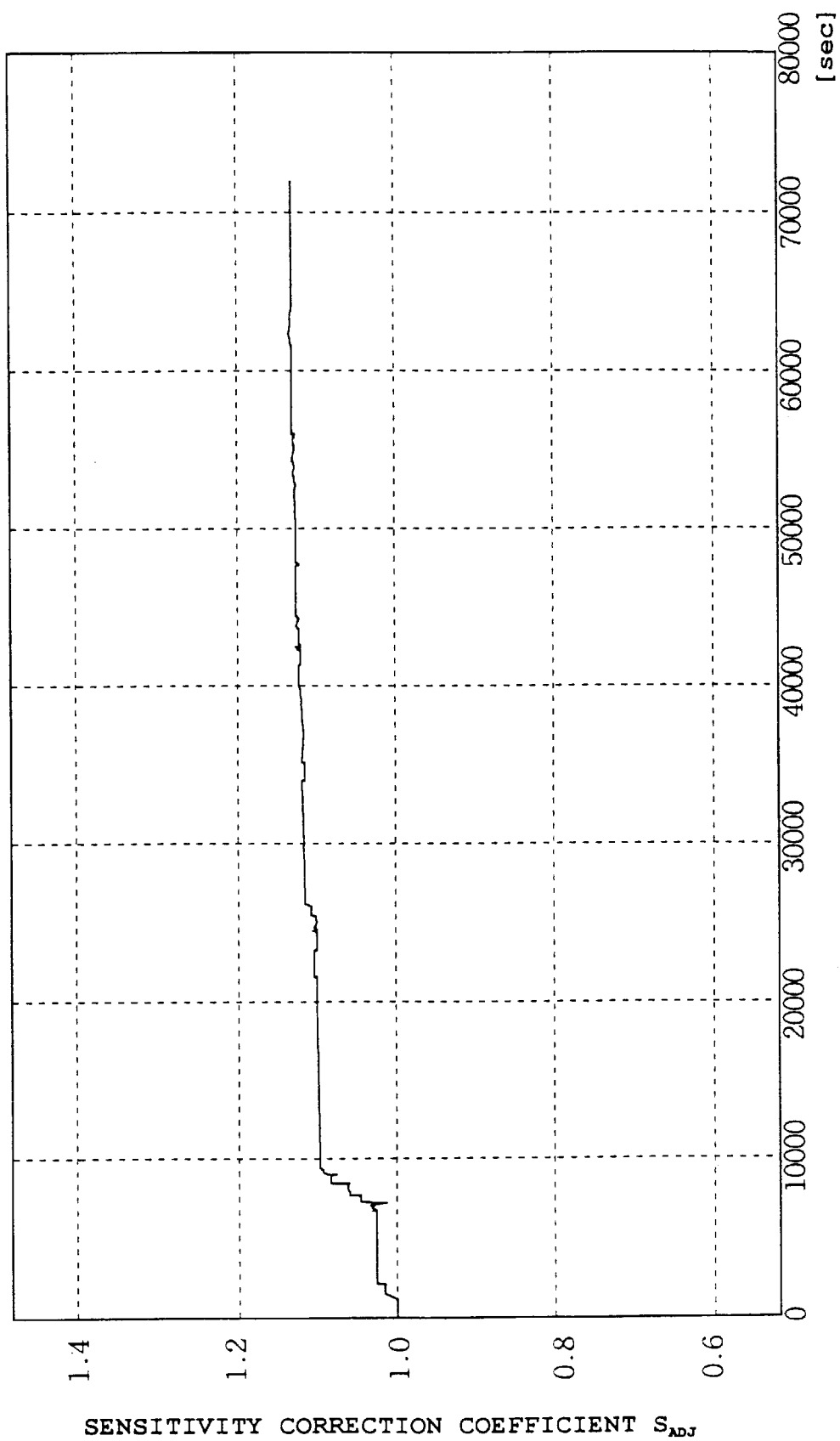
FIGS. 7, 8, and 9 are characteristic curvilinear diagrams explaining the simulation result of the sensitivity correction coefficient.
Figure 8:
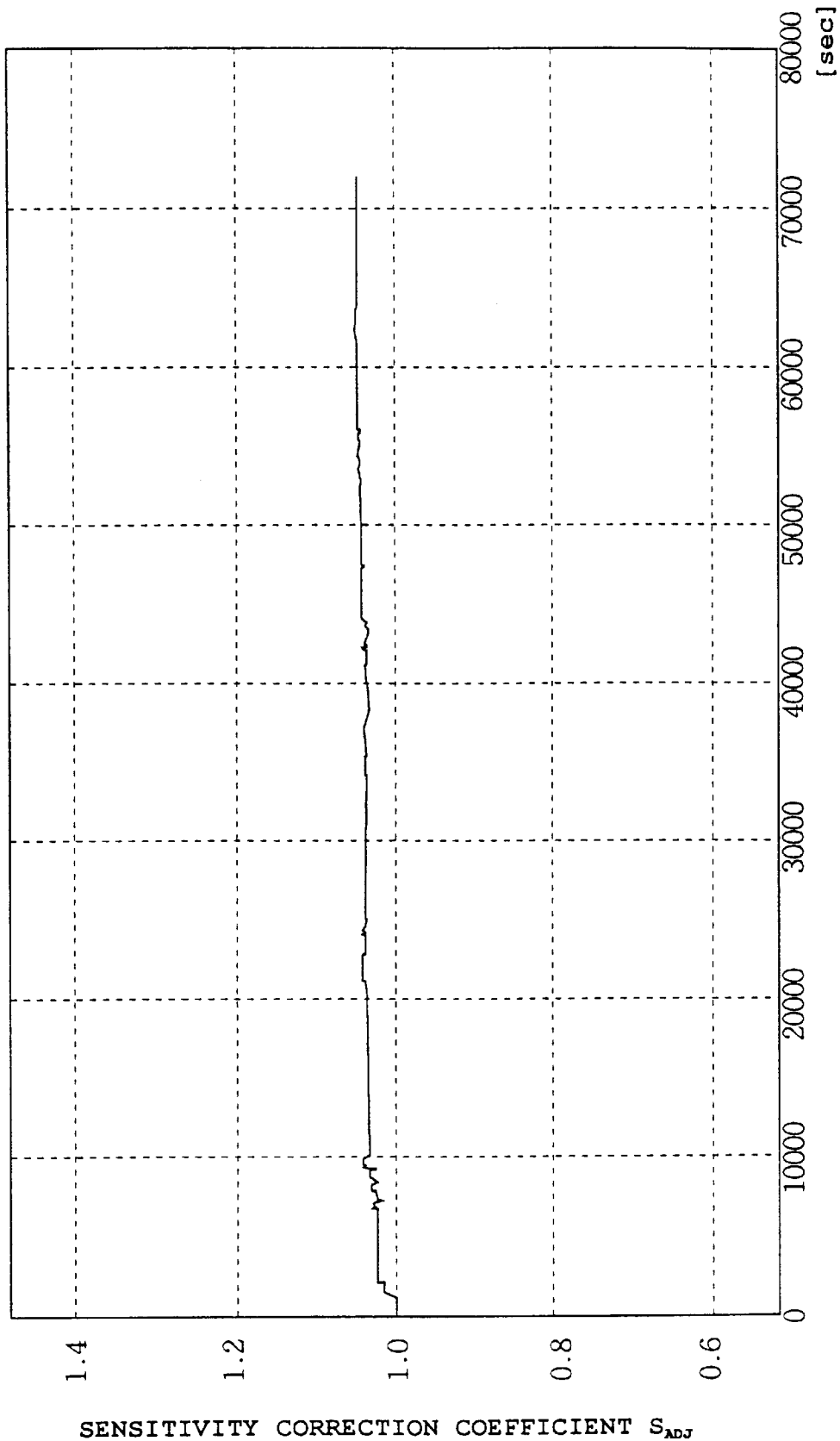
Figure 9:
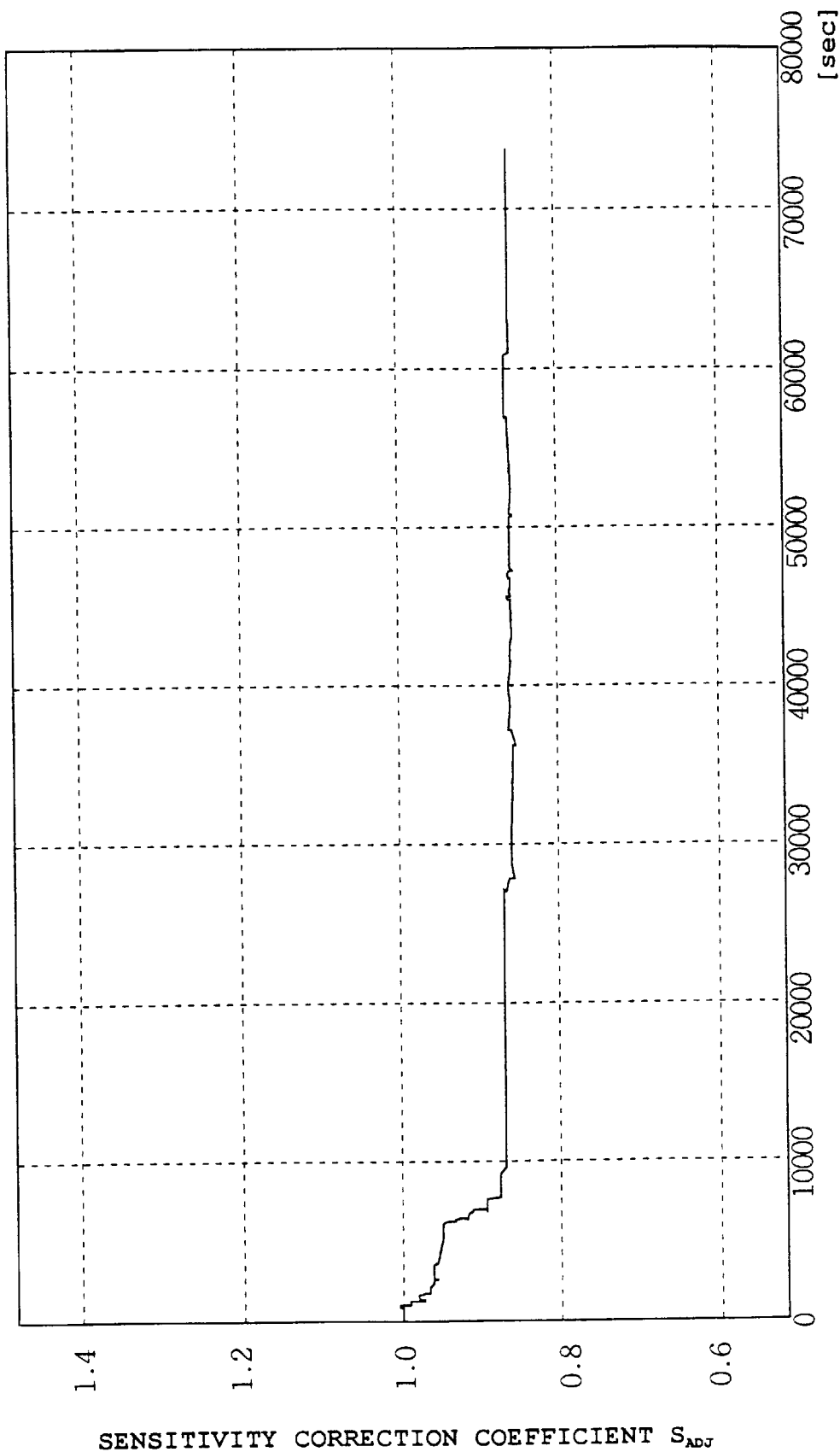

FIGS. 7 to 9 show the results of simulation in the case of practically obtaining the sensitivity correction coefficient $S_{ADJ}$ according to the procedures shown in FIGS. 4 to 6. When the output sensitivity of the angular velocity detector 9 is 0.866 times the normal value, as shown in FIG. 7, the sensitivity correction coefficient $S_{ADJ}$ starting with the initial value 1.0 reaches to the value 1.1 in approximately 10,000 seconds at a stroke, then, it gradually increases and finally converges to around 1.15. By multiplying such sensitivity correction coefficient $S_{ADJ}$ by the output of the angular velocity detector 9, the error in the output sensitivity, which was about 0.866 times the normal value, can be corrected.

When the output sensitivity of the angular velocity detector 9 is 0.9397 times the normal value, as shown in FIG. 8, the sensitivity correction coefficient $S_{ADJ}$ starting with the initial value 1.0 reaches to the value 1.03 in approximately 10,000 seconds at a stroke, then, it gradually increases and finally converges to around 1.06. By multiplying such sensitivity correction coefficient $S_{ADJ}$ by the output of the angular velocity detector 9, the error in the output sensitivity, which was about 0.9397 times the normal value, can be corrected.

And when the output sensitivity of the angular velocity detector 9 is 1.15 times the normal value, as shown in FIG. 9, the sensitivity correction coefficient $S_{ADJ}$ starting with the initial value 1.0 reaches to the value 0.88 in approximately 10,000 seconds at a stroke, then, it gradually reduces and finally converges to 0.86. By multiplying such sensitivity correction coefficient $S_{ADJ}$ by the output of the angular velocity detector 9, the error in the output sensitivity, which was about 1.15 times the normal value, can be corrected.

In this manner, the car navigation system 1 obtains the sensitivity correction coefficient $S_{ADJ}$ based on the GPS bearing obtained by receiving the radio waves from the GPS satellites and integrates it by the output signal from the angular velocity detector 9 to correct the output sensitivity of the angular velocity detector 9. Thereby, even if the output sensitivity of the angular velocity detector 9 varies, the car navigation system 1 can correct the output sensitivity and obtaining correct running direction data, and accurately detects the position of the vehicle by the self-navigation. In this embodiment, the correcting quantity is varied depending on the changes of the own car direction. Thus, even if the angular velocity detector 9 was attached slanted, and thus the output sensitivity is slanted, the error can be corrected. Accordingly, correct running direction data can be obtained without making the user do any troublesome adjustment.

According to the structure described above, the sensitivity correction coefficient $S_{ADJ}$ is obtained based on the GPS bearing and integrating it by the output of the angular velocity detector 9 to correct the output sensitivity of the angular velocity detector 9. Thereby, the output sensitivity of the angular velocity detector 9 can be improved with a simple structure and correct running direction data can be obtained.

By correcting the output sensitivity of the angular velocity detector 9 using such sensitivity correcting method when the position of the vehicle is detected, the car navigation system 1 in which the accuracy of detecting the position of a vehicle can be improved can be realized.

Besides, if such car navigation system 1 is loaded on the vehicle 6, the vehicle in which its present position can be detected accurately can be realized.

The embodiment described above has dealt with the case of correcting the output sensitivity of the angular velocity detector 9 on the basis of the GPS bearing obtained by receiving the radio waves from the GPS satellites. The present invention, however, is not only limited to this but also may read out the road direction data of a road estimated that the vehicle is running from the map data in the CD-ROM 11, computing the sensitivity correction coefficient $S_{ADJ}$ using the map data instead of the GPS bearing, integrating the sensitivity correction coefficient $S_{ADJ}$ by the output signal from the angular velocity detector 9, and corrects the output sensitivity of the angular velocity detector 9. Thereby, even if the radio waves from the GPS satellites cannot be received or the GPS bearing is not reliable because the vehicle is running at low speed, the position of the vehicle can be detected accurately by correcting the output sensitivity of the angular velocity detector 9. Note that, in this case, the navigation system may not have the GPS receiver because the output sensitivity is corrected by the road direction data.

Furthermore, the embodiments described above have dealt with the case of integrating the computed sensitivity correction coefficient $S_{ADJ}$ by the angular velocity signal S4 from the angular velocity detector 9 and correcting the sensitivity of the angular velocity signal S4 to correct the car bearing. The present invention, however, is not only limited to this but also may previously detect the own car bearing based on the angular velocity signal S4 and integrating the computed sensitivity correction coefficient $S_{ADJ}$ by the own car bearing to obtain a correct own car bearing.

Furthermore, the embodiments described above have dealt with the case of judging whether or not the parameter SUB1 is positive and the parameter SUB2 is negative, or the parameter SUB1 is negative and the parameter SUB2 is positive, in step SP21. The present invention, however, is not only limited to this but also can omit this step SP21. Because when a negative result is obtained in step SP19, the condition of step SP21 should be basically satisfied. In this connection, the embodiments described above include step SP21 to confirm the condition of the parameters SUB1 and SUB2.

The embodiments described above have dealt with the case of obtaining the speed signal S1 from the speed detector 5 equipped with the vehicle 6. The present invention, however, is not limited to this but also may provide the speed detector with the car navigation system.

Moreover, the embodiments described above have dealt with the case where the angular velocity detector 9 is the piezo-electric vibrating gyroscope. The present invention, however, is not limited to this but also may be widely applied in the case where the angular velocity detector 9 is an optical-fiber gyroscope or a terrestrial-magnetism sensor. In short, the same effects as the above embodiments can be obtained provided that the output sensitivity of the angular velocity detector is corrected based on the running direction data obtained from the GPS satellites, or the road direction data obtained from the map data as the modified example described above.

The embodiments described above have dealt with the case of using the GPS satellites as the satellites. The present invention, however, is not only limited to this but also the same effects as the above embodiments can be obtained by detecting the position of the vehicle by using the other satellites such as an INMARSAT system.

As described above, the present invention corrects the output sensitivity of the angular velocity detector on the basis of the running direction data measured by the satellites so that the error of the output sensitivity of the angular velocity detector can be corrected; thereby, the accuracy of output sensitivity can be easily improved. By employing such sensitivity correcting method, the accuracy of position detection can be improved by obtaining an angular velocity accurately, and thus the position of the vehicle can be detected accurately.

Furthermore, the present invention corrects the output sensitivity of the angular velocity detector on the basis of the road direction data of a road on which the vehicle is running so that the difference of the output sensitivity of the angular velocity detector can be corrected, thus the accuracy of output sensitivity can be easily improved. By employing such sensitivity correcting method, the accuracy of positional detection can be improved by obtaining a correct angular velocity, and thus the position of the vehicle can be detected accurately.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method for correcting an output sensitivity of an angular velocity detector which detects running directional data of a mobile object, comprising the steps of:

successively calculating first running directional data of said mobile object in accordance with an output signal of said angular velocity detector;

successively calculating second running directional data of said mobile object in accordance with positioning data obtained from a plurality of satellites;

storing said first and second running directional data of said mobile object;

calculating a sensitivity correction coefficient in accordance the stored first and second running direction data;

reducing said sensitivity correction coefficient when a first difference parameter and a second difference parameter are both plus or are both minus; and increasing said sensitivity correction coefficient in all other cases, wherein said first difference parameter is a difference between values corresponding to most recent first running directional data and previous first running direction data and said second difference parameter is a difference between first differential data and second differential data, said first differential data being a difference between values corresponding to most recent first running directional data and most recent second running directional data, and said second differential data being a difference between previous first running directional data and previous second running directional data; and multiplying the calculated sensitivity correction coefficient by the output signal of said angular velocity detector so as to correct the output sensitivity of said angular velocity detector.

2. The method for correcting the output sensitivity according to claim 1, further comprising a step of:

detecting a velocity of said mobile object, wherein said sensitivity correction coefficient is calculated when the detected velocity of said mobile object exceeds a predetermined velocity.

3. The method for correcting the output sensitivity according to claim 1, wherein;

said sensitivity correction coefficient is calculated when said first difference parameter, which is calculated based on most recent data and previous data of said first running directional data of said mobile object, exceeds a predetermined value.

4. The method for correcting the output sensitivity according to claim 1, wherein said plurality of satellites are global positioning system (GPS) satellites.

5. An apparatus for correcting an output sensitivity of an angular velocity detector that successively outputs first running directional data of a mobile object, the apparatus comprising:

a GPS receiver for successively outputting second running direction data of said mobile object in accordance with positioning data obtained from a plurality of satellites;

storing means for storing said first and second running directional data of said mobile object; and control means for calculating a sensitivity correction coefficient in accordance with said first and second running directional data from said storing means and for multiplying the sensitivity correction coefficient by an output signal of said angular velocity detector, so as to correct the output sensitivity of said angular velocity detector, wherein said control means reduces said sensitivity correction coefficient when a first difference parameter and a second difference parameter are both plus or are both minus, and said control means increases said sensitivity correction coefficient in all other cases, wherein said first difference parameter is a difference between values corresponding to most recent first running directional data and previous first running directional data and said second difference parameter is a difference between first differential data and second differential data, said first differential data being a difference between the values corresponding to most recent first running directional data and most recent second running directional data, and said second differential data being a difference between previous first running directional data and previous second running directional data.

6. The apparatus for correcting the output sensitivity of the angular velocity detector according to claim 5, wherein said control means calculates said sensitivity correction coefficient when a velocity of said mobile object exceeds a predetermined velocity.

7. The apparatus for correcting the output sensitivity of the angular velocity detector according to claim 5, wherein;

said control means calculates said sensitivity correction coefficient when, said first difference parameter which is calculated based on most recent data and previous data of said first running directional data of said mobile object, exceeds a predetermined value.

* * * * *